United States Patent [19]

Stephen et al.

[11] Patent Number: 4,777,927

[45] Date of Patent: * Oct. 18, 1988

[54] BARBEQUE KETTLE

[75] Inventors: James C. Stephen, Arlington Heights; Erich J. Schlosser, Lindenhurst; Andrzej Leja, Palatine, all of Ill.

[73] Assignee: Weber-Stephen Products Co., Palatine, Ill.

[*] Notice: The portion of the term of this patent subsequent to Jul. 7, 2004 has been disclaimed.

[21] Appl. No.: 69,765

[22] Filed: Jul. 6, 1987

Related U.S. Application Data

[63] Continuation-in-part of Ser. No. 759,531, Jul. 26, 1985, Pat. No. 4,677,964.

[51] Int. Cl.⁴ .............................................. F24B 3/00
[52] U.S. Cl. .............................................. 126/25 R
[58] Field of Search .................. 126/25 R, 41 R, 9 R

[56] References Cited

U.S. PATENT DOCUMENTS

| | | | |
|---|---|---|---|
| 2,918,051 | 12/1959 | Broman | 126/25 R |
| 3,302,555 | 2/1967 | Burwell | 126/25 R |
| 3,931,805 | 1/1976 | Nelson | 126/41 R |
| 3,959,620 | 5/1976 | Stephen | 126/41 R |
| 4,416,248 | 11/1983 | Schlosser | 126/25 R |
| 4,523,574 | 6/1985 | Schlosser | 126/25 R |
| 4,677,964 | 7/1987 | Lohmeyer et al. | 126/41 R |

FOREIGN PATENT DOCUMENTS 2041614 2/1972 Fed. Rep. of Germany .... 126/25 R

Primary Examiner—Carroll B. Dority, Jr.
Attorney, Agent, or Firm—Robert E. Wagner; Ralph R. Rath

[57] ABSTRACT

A barbeque kettle includes a bowl and a cover with the bowl having a food support grid adjacent an upper rim and a charcoal grid below the food grid along with a cover holder adjacent the rim of the bowl. The cover has a removable thermometer that can sense the initial temperature of the kettle and can also be used as a food thermometer. A pair of charcoal baskets are positionable on the charcoal grid for direct or indirect cooking.

18 Claims, 2 Drawing Sheets

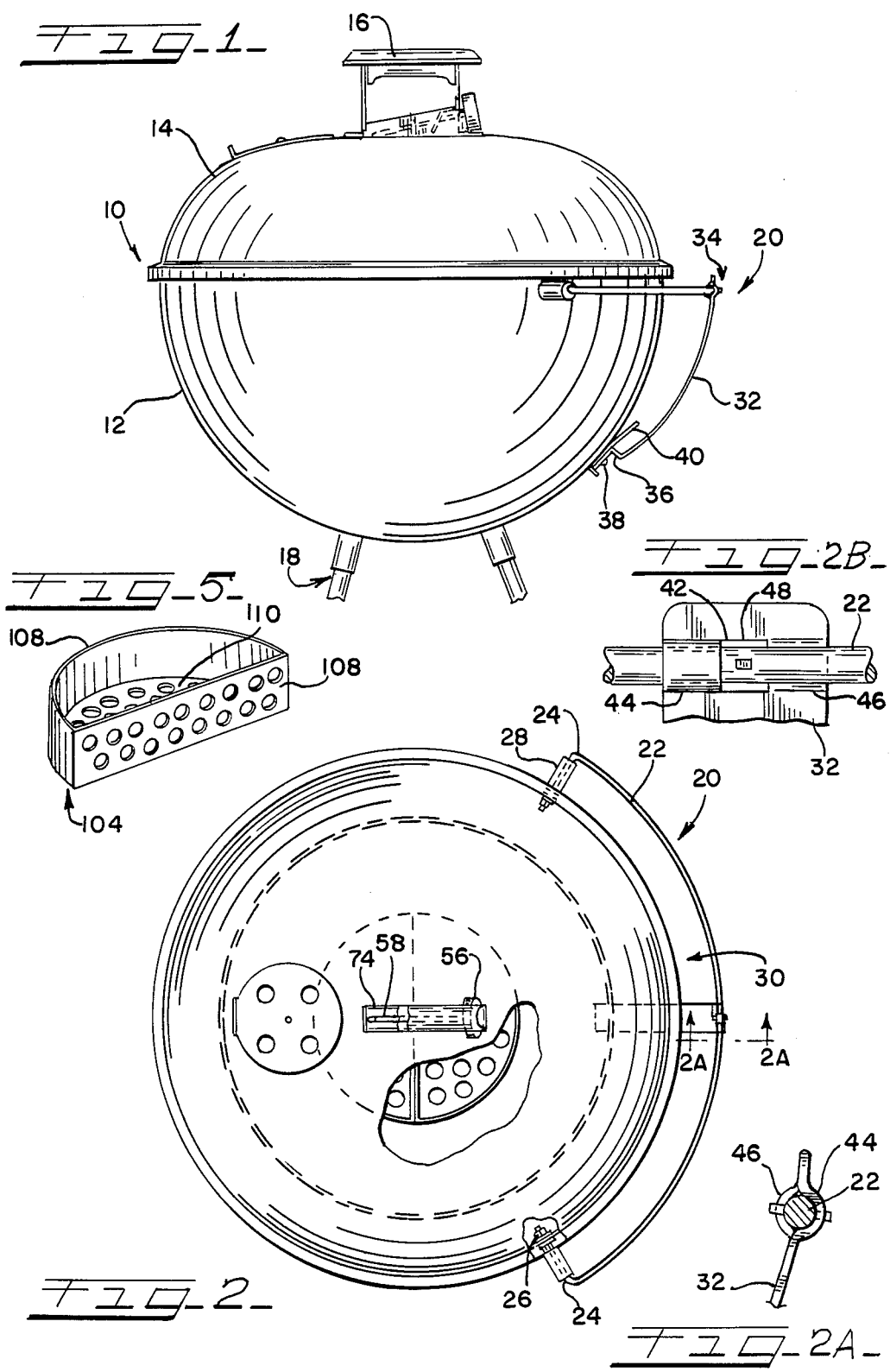

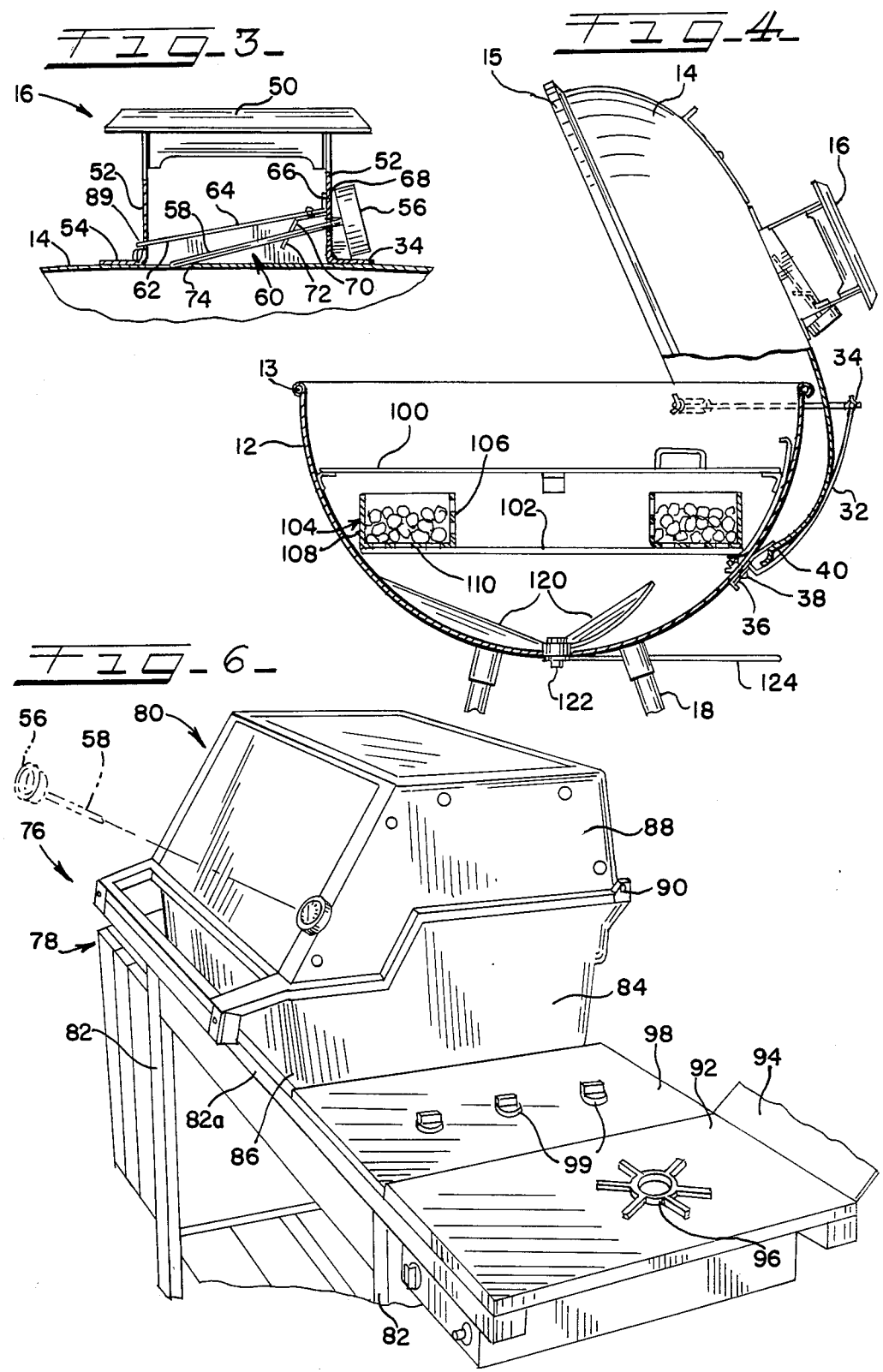

BARBEQUE KETTLE

REFERENCE TO RELATED APPLICATION

This application is a continuation-in-part application of U.S. Ser. No. 759,531, filed July 26, 1985, now U.S. Pat. No. 4,677,964.

TECHNICAL FIELD

The present invention relates generally to outdoor cooking devices and more particularly to barbeque grills.

BACKGROUND PRIOR ART

Outdoor cooking devices have been in existence for many decades. One of the most popular types of cooking devices that is presently being marketed by the Assignee of the present invention is commonly referred to as a barbeque kettle. The barbeque kettle consists of a generally hemispherical bowl that has a circular open top with a cooking surface slightly below the upper edge or rim of the bowl and a cover. The bowl is supported on some type of a structure, usually a tripod leg arrangement. This kettle configuration is a trademark of the Assignee of the present invention.

Barbeque kettles that are designed for burning charcoal as a fuel also have a second grid for supporting the charcoal below the cooking surface and the bowl and cover have vent openings to provide the necessary oxygen for combustion of the charcoal while the cover is closed.

One type of barbeque kettle that has received very favorable acceptance by consumers is disclosed in U.S. Pat. No. 4,416,248, owned by the Assignee of the present invention, which is sold under the trademark ONE TOUCH ®.

This barbeque kettle has elongated slots for vent holes in the bowl that are designed to be closed by elongated rake arms that are connected to a center post with an external handle connected to the post so that all arms are moved simultaneously. The arms act as rakes to move any ashes accumulated in the bottom of the bowl to the elongated slots.

Many times it is desirable to have the cover partially shield the cooking surface, such as during outdoor cooking in extremely windy conditions. Various mechanisms have been proposed, and one example is shown in U.S. Pat. No. 4,523,574, assigned to the Assignee of the present invention.

With the increased use of the barbeque kettle as a replacement for the oven in the kitchen, it is many times desirable to know the internal temperature of the kettle. The above-mentioned application discloses a thermometer that senses the internal temperature and can also be used for sensing the temperature of food being prepared through the use of a chart that converts the temperature reading on the thermometer to an equivalent cooking degree, such as rare or medium.

When cooking larger items, such as turkey, roasts or the like, an indirect cooking method is used. For indirect cooking, a foil pan is inserted onto the charcoal grid below the food and the charcoal is placed on opposite sides of the pan. When steaks or the like are being cooked, it is customary to use the direct method of cooking where the entire grid is covered with charcoal so that the dripping fats from the food are ignited and sear the food.

SUMMARY OF THE INVENTION

According to the present invention, a barbeque kettle of the type disclosed in U.S. Pat. No. 4,416,248 has a number of novel features incorporated therein to make the unit more versatile and appealing to the consumer.

More specifically, the barbeque kettle, which includes a hemispherical bowl and a generally hemispherical cover, has a novel cradle structure on the bowl for supporting the cover on the bowl. The cradle structure consists of a circular rod that has opposite ends bent at right angles and extending through the bowl, being secured by nuts. The rod defines an arcuate slot for receiving the cover. A pair of non-metallic rollers are supported on the bent end portions of the rod and act as anti-friction means while the cover is introduced into the arcuate slot. The cradle structure also has a support bar extending from an intermediate portion of the rod and extends downwardly, being secured to the bowl at its lower end. A spring clip is interposed between the support bar and the bowl with the spring clip being cantilevered into the space between the bowl and the support bar to prevent the cover from hitting the bowl and possibly chipping the porcelain.

According to one aspect to the present invention, the cover has a thermometer supported by a bracket structure on the handle of the cover and normally extending through a slot in the cover. The bracket structure includes a spring clip so the thermometer is frictionally held on the cover but can easily be removed and used as a food thermometer for sensing the internal temperature of the food being prepared.

According to a further aspect of the invention, a pair of identical charcoal baskets are provided and each basket has a flat inner wall and an arcuate outer wall as well as a flat bottom wall. The configuration of the baskets allows the baskets to be spaced from each other for indirect cooking and placed with the flat walls in engagement for direct cooking.

BRIEF DESCRIPTION OF SEVERAL VIEWS OF DRAWINGS

FIG. 1 is a side elevational view of the barbeque kettle;

FIG. 2 is a plan view, with certain parts broken away;

FIG. 2A is a fragmentary cross-sectional view of the barbeque kettle, as viewed along line 2A—2A of FIG. 2;

FIG. 2B is a plan view of the structure shown in FIG. 2A;

FIG. 3 is a fragmentary sectional view of the thermometer bracket structure;

FIG. 4 is a cross-sectional view, showing the cover supported in the cradle structure;

FIG. 5 is a perspective view of one of the charcoal baskets; and,

FIG. 6 is a perspective view of another type of grill with a thermometer supported on the cover.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to embodiments illustrated.

FIG. 1 of the drawings discloses a barbeque kettle, generally designated by reference numeral 10, comprising a generally semi-hemispherical bowl 12 and a semi-hemispherical cover 14 having a handle 16 thereon. The bowl 12 has an upper edge or lip 13, while the cover 14 has a sealing rim 15. The kettle 10 is generally constructed in accordance with the teachings of U.S. Pat. No. 4,416,248, and is supported by a tripod leg arrangement 18 of the type disclosed in U.S. Pat. No. 3,538,906, both patents being incorporated therein by reference.

According to one aspect of the invention, the bowl has a cradle means 20 on its outer periphery thereof for supporting the cover 14 in a generally vertical position, as shown in FIG. 4. The cradle means or cover holder 20 consists of a generally circular rod 22 having opposite end portions 24 extending at right angles from the arcuate center portion. The end portions 24 have a flattened portion that acts as an abutment extending through openings in the bowl, being secured thereto by nuts 26 received on the threaded portions of the ends 24. A pair of nonmetallic nylon rollers 28 are rotatably supported on the bent end portions 24. The arcuate circular rod 22 thus defines a generally arcuate slot 30 spanning less than 180° adjacent the upper peripheral edge of the bowl and is configured to receive the cover 14.

The cradle means or cover holder 20 also includes an elongated strap or band 32 that has its upper end 34 connected to the rod 22 at the center thereof. The lower end of the band 32 has an offset portion 36 which is connected to the bowl by a bolt 38 (FIG. 4). The cover holder or cradle means 20 also includes a cantilevered spring 40 which is positioned between the outer surface of the bowl 12 and the offset 36 and is connected by the bolt 38. The cantilevered spring 40 extends upwardly into the space between the band 32 and the surface of the bowl 12, as shown in FIGS. 1 and 4.

According to one aspect of the invention, Applicants have devised a unique connection between the band and the rod that does not require any fasteners. As shown in FIGS. 2A and 2B, the upper end of the band has a slot 42 intermediate opposite edges and the band has an arcuate offset 44 from one surface between slot 42 and one edge of the band and a second arcuate offset 46 between the slot and the opposite edge of the band that is offset from the other surface of the band. The rod has a pair of diametrically-opposed projections 48.

In assembling the rod and band, the band is positioned perpendicular to the axis of the rod and the band is moved into alignment with the projections 48. The band is then rotated 90° so that the offsets 44 and 46 are on opposite sides of the projections 48 with the rod 22 in engagement with the respective offsets.

In the assembled position, the projections define abutments for the adjacent edges of the offsets 44, 46 to prevent axial movement of the band on the rod.

Thus, the cover can easily be moved from the position illustrated in FIG. 1 to the position shown in FIG. 4 by gripping the handle 16 and slightly tilting the cover to disengage the rim or flange 15 from the lip 13 of the bowl and then sliding the cover into the arcuate slot 30 until the inner surface of the lid engages the cantilever spring or bumper 40. During the tilting movement, the lip 15 of the cover 14 will slide along the band 32 and the cantilevered spring 40 will act as a bumper engaging the inner surface of the cover 14 to prevent the cover from engaging the outer surface of the bowl and preclude any chipping of the cover or the bowl. At the same time, the nylon rollers will act as anti-friction means.

In the open position, illustrated in FIG. 4, the rim 15 is supported on rollers 28 and the lower edge is frictionally gripped between the bumper 40 and the band 32 but will not engage the offset 36 to prevent chipping the cover. For this purpose, the arcuate slot 30 spans an arcuate distance of about 115°.

According to a further aspect of the present invention, the grill 10 includes a removable thermometer that serves the dual purpose of sensing the temperature of the grill when the cover is located thereon and also can be removed for sensing the temperature of the food being cooked. As shown in FIG. 3, the handle 16 on cover 14 includes a base or gripping portion 50 having a pair of legs 52 extending therefrom which are secured to the cover 14 by welding the flanges 54 to the cover. A removable thermometer 56 having a piercing portion or projection 58 is releasably supported on the handle by a bracket means 60. The bracket means 60 includes a generally U-shaped plate 62 that is supported between the legs 52 and includes a base portion 64 that is positioned in an inclined position with respect to the legs 52 and has an offset end portion 66 that has a projection 68 on the upper end thereof. The opposite end of the bracket 60 has a slot for receiving one of the legs 52 and a projection 89 received into an opening in the leg 52. Thus, the bracket can be installed merely by manipulation of the bracket into the position shown in FIG. 3 and the projections manipulated into openings in the legs 52.

According to a further aspect of the invention, the bracket 62 includes gripping means 70 in the form of a cantilevered spring that is secured to the base 64 of the bracket and has a slot 72 for receiving the piercing portion 58 of the thermometer.

Thus, the thermometer is positioned on the cover by forcing the piercing portion through an opening in the leg 52 and through the slot 72 to have the free end portion received into an elongated opening 74 in the cover 14. In this position, shown in FIG. 3, the thermometer 56 will sense the internal temperature of the grill for indirect cooking of larger items, such as poultry and roasts, so that the temperature can readily be controlled for proper cooking. It should be noted that the slot 74 is under the bracket 60 so that it is not exposed.

When it is desired to sense the internal temperature of the food being prepared, the thermometer can readily be removed from the cover, the cover positioned as shown in FIG. 4, and the thermometer can be inserted into the food to sense the temperature of the food. For this purpose, it is desirable to have a conversion chart for converting the ambient temperature on the thermometer into the preparedness of the food being cooked, such as rare, medium or welldone.

The dual purpose thermometer can also be incorporated into other types of outdoor cooking devices, such as disclosed in the above-mentioned application. FIG. 6 shows a gas grill 76 of the disclosed application which includes a support frame or cart 78 and a fire box 80 supported on the support frame. The cart 78 consists of a plurality of hollow rectangular tubular members 82 with two upper members 82a being transversely spaced to define a rectangular space therebetween.

The fire box 80 is rectangular and has a lower housing or bowl 84 which has ledges 86 resting on members 82a. The fire box also has a cover 88 connected to the bowl by a rear hinge 90. The cover 88 has an opening for receiving the piercing portion 58 of the thermometer 56.

The gas grill 76 also has a separate side burner 90 that has flanges 93 resting on side members 82a. The side burner has a gas burner 96 that is enclosed in a cover when it is not being used.

The gas grill 76 also has a control panel 98 located between the fire box 80 and the side burner 92. The control panel has three control knobs 99 for controlling the flow of gas to three burner tubes (not shown) located in the housing 84.

According to a further aspect of the present invention, the barbeque kettle also incorporates charcoal baskets that can readily be positioned for direct or indirect cooking. As is customary, the bowl 12 has a food support grid 100 located below the lip 13 and a charcoal supporting grid 102 below the food support grid 100. A pair of identical charcoal baskets 104 (FIG. 5), each have a flat perforated inner wall 106, an arcuate outer wall 108 and a flat perforated bottom wall 110.

The baskets 104 can be positioned in the position shown in FIG. 4 wherein the inner walls are spaced from each other for indirect cooking and a drip pan can be placed between the charcoal baskets. If it is desired to utilize the direct cooking method, the baskets are positioned with their inner flat walls in engagement with each other, as shown in FIG. 2, to produce a generally circular bed of charcoal for direct cooking purposes. Of course, the charcoal baskets can be removed and the charcoal can be positioned directly on the support grid 102 for direct cooking, if desired.

The grill 10 shown in FIGS. 1-4 incorporates the venting system, as disclosed in the above-mentioned U.S. Pat. No. 4,416,248. The venting system includes three narrow elongated radially-extending slots (not shown) that are spaced 120° from each other in the bottom of the bowl 12. An equal number of rake arms 120 are supported on a center post 122 which is rotatably supported in the bottom of the bowl 12. The center post has a handle 124 extending radially therefrom and is positioned between a pair of legs 18. The rake arms 120 are generally inverted V-shaped members that have a width sufficient to cover the elongated vent slots.

The rake arms 120 again are circumferentially-spaced at about 120° and the handle 124 is positioned on the post 122, such that the rake arms cover the vent slots when the handle 124 is in engagement with one of the legs. Since the legs are equally circumferentially-spaced by about 120°, movement of the handle 124 between an adjacent pair of legs will cause the rake arms 120 to traverse the entire bottom of the bowl and, therefore, move any accumulated ashes to the elongated slots.

The barbeque kettle disclosed herein is very versatile and appealing, but changes could be made without departing from the spirit of the invention. For example, the thermometer bracket could be changed or eliminated. Also, the bottom wall of the baskets could be eliminated and the configuration could be changed.

While the specific embodiments have been illustrated and described, numerous modifications come to mind without significantly departing from the spirit of the invention and the scope of protection is only limited by the scope of the accompanying claims.

We claim:

1. In combination with a grill having a fire box and a cover having a handle with a combustion source in said fire box and a food support grid above said combustion source, the improvement of a thermometer removably supported on said cover for sensing the internal temperature in said fire box, bracket means on said handle for support said thermometer, said bracket means including friction means for engaging said thermometer to frictionally grip the thermometer on the cover, said thermometer having a piercing projection portion extending through said cover, said thermometer being removable from said cover and insertable into food being cooked to sense the internal temperature of the food.

2. The combination as defined in claim 1, in which said handle has a pair of legs extending from a gripping portion which are secured to said cover and in which said bracket means includes a plate extending between said legs with a cantilevered spring carried by said plate and extending toward said cover with said cantilevered spring having a slot for receiving the piercing portion of said thermometer.

3. The combination as defined in claim 1, in which said fire box is a generally hemispherical bowl and said cover is generally hemispherical with said bowl having cradle means on its periphery for supporting said cover on said bowl.

4. In a grill including a circular bowl having a cooking grid adjacent an upper edge thereof and a cover removably supported on said bowl, the improvement of a cover holder on said bowl, said cover holder comprising means defining an arcuate space around said upper edge for receiving said cover and strap means extending downward from said means, said strap means defining a cradle for said cover.

5. A grill as defined in claim 4, in which said strap means is connected to said cover at said lower end with bumper means adjacent said lower end for engaging an inner surface of said cover to prevent direct engagement between said cover and said bowl.

6. A charcoal grill as defined in claim 5, in which said means defining an arcurate space includes a rod having opposite end portions connected to said bowl with a removable connection between said rod and said strap means.

7. A charcoal grill as defined in claim 6, in which said strap means includes a band having one end connected to said rod and an opposite end connected to said bowl and in which said bumper means includes a cantilevered spring member connected by a common connection to said bowl.

8. A charcoal grill as defined in claim 7, in which removable said connection includes a fastenerless connection consisting of a pair of diametric projections on said rod with said band having slot means receiving said rod and a pair of arcuate offsets respectively between said slot means and opposite edges of said band so that said rod can be manipulated through said slot means and aligned with said projections and the band can then be rotated to have said offsets engage said rod on opposite sides of said projections with said projections acting as abutments to prevent axial movement of said band on said rod.

9. A grill as defined in claim 6, 7 or 8, further including anti-friction means on said opposite end portions for engaging said cover while being moved into said cradle.

10. A grill as defined in claim 4, further including a thermometer removably supported on said cover, said thermometer having a piercing portion extending through said cover to sense the internal temperature of said grill, said thermometer being removable from said cover and insertable into food on said cooking grid to sense the internal temperature thereof.

11. A grill as defined in claim 3 or 4, in which said bowl has a plurality of circumferentially-spaced elongated vent slots in its bottom and cover means for said vent slots comprising a center post rotatably supported in said bottom and a plurality of rake arms equal in number to said vent slots extending radially from said center post, said rake arms each having a width sufficient to cover a vent slot and being configured to move ashes collected on said bottom to said vent slots when said center post is rotated.

12. A grill as defined in claim 11, in which there are three equally circumferentially-spaced vent slots with a tripod leg arrangement extending from said bowl to support said grill, said center post having a handle extending radially outwardly between a pair of said legs, said handle having a first position engaging one of said legs where said rake arms cover said vent slots and being movable to engage the other of said pair of legs so that said rake arms traverse all of the bottom between said vent slots.

13. The combination as defined in claim 3 or 4, in which said bowl has a support grid for supporting charcoal below said food support grid, and further including a pair of charcoal baskets, each having a flat inner wall and an arcuate outer wall, said baskets being positionable in a first position on said charcoal support grid with said inner walls in engagement with each other for direct cooking and a second position where said inner walls are spaced from each other for indirect cooking.

14. The combination as defined in claim 13, in which said inner wall is perforated and said outer wall is arcuate.

15. In a charcoal grill including a bowl having a horizontal cooking grid extending aross an upper opening of said bowl and a horizontal support surface below said cooking grid, the improvement of a pair of charcoal baskets of substantially identical configuration supported on said support surface, each having a flat inner vertical wall, an arcurate, vertical wall connected to opposite ends of said inner wall and a flat perforated bottom wall, said baskets being positionable to a first position where said inner walls are in juxtaposed position for producing a center charcoal bed for direct cooking and also being positionable to a second position where the inner walls are spaced from each other for indirect cooking.

16. In a barbeque kettle having a circular bowl and a semi-hemispherical cover and a cover holder on said cover, the improvement of said cover holder including a rod bent at opposite ends and connected to said bowl to define an arcuate slot, and a flat band having a first connection at one end to an intermediate portion of said rod and an opposite end connected to said bowl below said rod to define a cradle, said first connection including a fastenerless connection consisting of a pair of diametric projections on said rod with said band having slot means receiving said rod and a pair of arcuate offsets respectively between said slot means and opposite edges of said band so that said rod can be manipulated through said slot means and aligned with said projections and the band can then be rotated to have said offsets engage said rod on opposite sides of said projections with said projections acting as abutments to prevent axial movement of said band on said rod.

17. A barbeque kettle as defined in claim 16, further including bumper means adjacent said opposite end of said band for engaging an inner surface of said cover to prevent direct contact between said cover and said bowl.

18. A portable gas grill characterized by a cart of generally rectangular configuration and consisting of a plurality of tubular members and including at least two transversely-spaced upper members defining a space therebetween, a housing defining a cooking chamber and having opposed ledges supported on said upper members, said housing having a cooking grid adjacent an upper edge and a cover thereon, and a removable side burner supported in said space on said upper members adjacent said housing.

* * * * *